US009656757B2

(12) United States Patent
Henze

(10) Patent No.: US 9,656,757 B2
(45) Date of Patent: May 23, 2017

(54) PROPELLER DEICING SYSTEM

(75) Inventor: Chad M. Henze, Granby, CT (US)

(73) Assignee: Hamilton Sundstrand Corporation, Rockford, IL (US)

(*) Notice: Subject to any disclaimer, the term of this patent is extended or adjusted under 35 U.S.C. 154(b) by 2534 days.

(21) Appl. No.: 12/396,896

(22) Filed: Mar. 3, 2009

(65) Prior Publication Data

US 2010/0065541 A1 Mar. 18, 2010

Related U.S. Application Data

(60) Provisional application No. 61/192,138, filed on Sep. 16, 2008.

(51) Int. Cl.
*B64D 15/02* (2006.01)
*B64D 15/12* (2006.01)

(52) U.S. Cl.
CPC .................................. *B64D 15/12* (2013.01)

(58) Field of Classification Search
CPC ...................................................... B64D 15/02
USPC ...... 244/134 B, 134 C, 134 D, 134 F, 134 R; 219/202, 482; 416/1, 36, 37, 39, 95
See application file for complete search history.

(56) References Cited

U.S. PATENT DOCUMENTS

| | | | |
|---|---|---|---|
| 684,459 A * | 10/1901 | Porter | 392/362 |
| 2,437,318 A * | 3/1948 | Field | 244/134 B |
| 2,540,472 A * | 2/1951 | Boyd et al. | 219/201 |
| 2,556,736 A * | 6/1951 | Palmatier | 244/134 B |
| 2,638,295 A * | 5/1953 | Sheets | 244/134 D |
| 2,690,890 A * | 10/1954 | Weeks et al. | 244/134 D |
| 3,657,514 A * | 4/1972 | Adams | B64D 15/14 219/201 |
| 4,292,502 A * | 9/1981 | Adams | 219/483 |
| 4,424,947 A * | 1/1984 | Adams et al. | 244/134 D |
| 4,944,655 A * | 7/1990 | Merz | 416/61 |
| 5,074,497 A * | 12/1991 | Phillips, II | 244/134 D |
| 5,131,812 A * | 7/1992 | Boyd et al. | 416/95 |
| 5,174,717 A * | 12/1992 | Moore | 416/39 |
| 5,558,495 A * | 9/1996 | Parker et al. | 416/95 |
| 5,691,691 A * | 11/1997 | Merwin et al. | 375/259 |
| 5,709,532 A * | 1/1998 | Giamati et al. | 416/39 |
| 5,997,250 A * | 12/1999 | Carter, Jr. et al. | 416/27 |
| 6,070,418 A * | 6/2000 | Crabtree et al. | 62/86 |
| 6,253,126 B1 * | 6/2001 | Palmer | 701/14 |
| 6,304,194 B1 | 10/2001 | McKillip | |
| 6,612,810 B1 * | 9/2003 | Olsen et al. | 416/95 |
| 6,814,544 B2 * | 11/2004 | Tsukamoto et al. | 416/96 R |
| 6,851,929 B2 * | 2/2005 | Goldberg | 416/1 |
| 6,890,152 B1 * | 5/2005 | Thisted | 416/1 |
| 7,043,146 B2 * | 5/2006 | Semaza | 392/362 |

(Continued)

FOREIGN PATENT DOCUMENTS

WO 2006093480 A1 9/2006
WO 2007/107732 9/2007

OTHER PUBLICATIONS

European Patent Office, Extended European Search Report, May 30, 2012, 6 pages.

*Primary Examiner* — Dana Ross
*Assistant Examiner* — Ayub Maye
(74) *Attorney, Agent, or Firm* — Kinney & Lange, P.A.

(57) ABSTRACT

Systems and methods of deicing aircraft propellers include a deicing heater timing cycle, i.e. heater on/heater off schedule that is calculated as a function of ambient temperature and the airspeed of the aircraft.

25 Claims, 6 Drawing Sheets

(56) References Cited

U.S. PATENT DOCUMENTS

| | | | |
|---|---|---|---|
| 7,086,834 B2 * | 8/2006 | LeMieux | 416/1 |
| 7,129,846 B2 * | 10/2006 | Rasmussen et al. | 340/580 |
| 7,131,812 B2 * | 11/2006 | Brueckner | 415/4.3 |
| 7,313,963 B2 * | 1/2008 | Kuznar | 73/700 |
| 7,348,683 B2 * | 3/2008 | Riesberg | 290/1 R |
| 7,355,302 B2 * | 4/2008 | Stonestreet et al. | 307/29 |
| 2003/0178412 A1 | 9/2003 | Goldberg et al. | |
| 2003/0180145 A1 * | 9/2003 | Goldberg | 416/1 |
| 2005/0082435 A1 * | 4/2005 | Rasmussen et al. | 244/134 C |
| 2006/0018752 A1 * | 1/2006 | LeMieux | 416/96 R |
| 2007/0086893 A1 * | 4/2007 | Pedersen | 416/61 |
| 2007/0114223 A1 * | 5/2007 | Stonestreet, II et al. | 219/482 |
| 2007/0170312 A1 | 7/2007 | Al-Khalil | |
| 2007/0199384 A1 * | 8/2007 | Kuznar | 73/700 |
| 2007/0240435 A1 | 10/2007 | Elpern et al. | |
| 2008/0061559 A1 * | 3/2008 | Hirshberg | 290/55 |
| 2008/0124222 A1 * | 5/2008 | Vontell et al. | 416/224 |
| 2008/0181775 A1 * | 7/2008 | Livingston et al. | 416/95 |

* cited by examiner

PROPELLER DEICING SYSTEM

CROSS-REFERENCE TO RELATED APPLICATION(S)

This application claims priority to U.S. Provisional Pat. App. No. 61/192,138; filed Sep. 16, 2008, which is hereby incorporated by reference in its entirety.

BACKGROUND

Due to electrical power limitations, aircraft propeller ice protection is typically performed by deicing, where blade heaters are cycled on and off to shed accreted ice, as opposed to anti-icing where heaters are left on continuously to avoid any ice accretion. Current propeller deicing systems employ discrete heater timing cycles (heater on/heater off schedules) based on ambient air temperature. These discrete timing cycles make it difficult to design a system which operates optimally at all flight conditions. Therefore, a need exists for improved systems and methods of deicing propeller blades that dynamically adjust for varying flight conditions allowing the deicing system to remove ice from the blades more effectively over the full range of aircraft flight conditions.

SUMMARY

Embodiments of the present invention include systems and methods of deicing aircraft propellers in which a deicing heater timing cycle, i.e. heater on/heater off schedule, is calculated as a function of ambient temperature and the airspeed of the aircraft.

DETAILED DESCRIPTION

Figure 1:
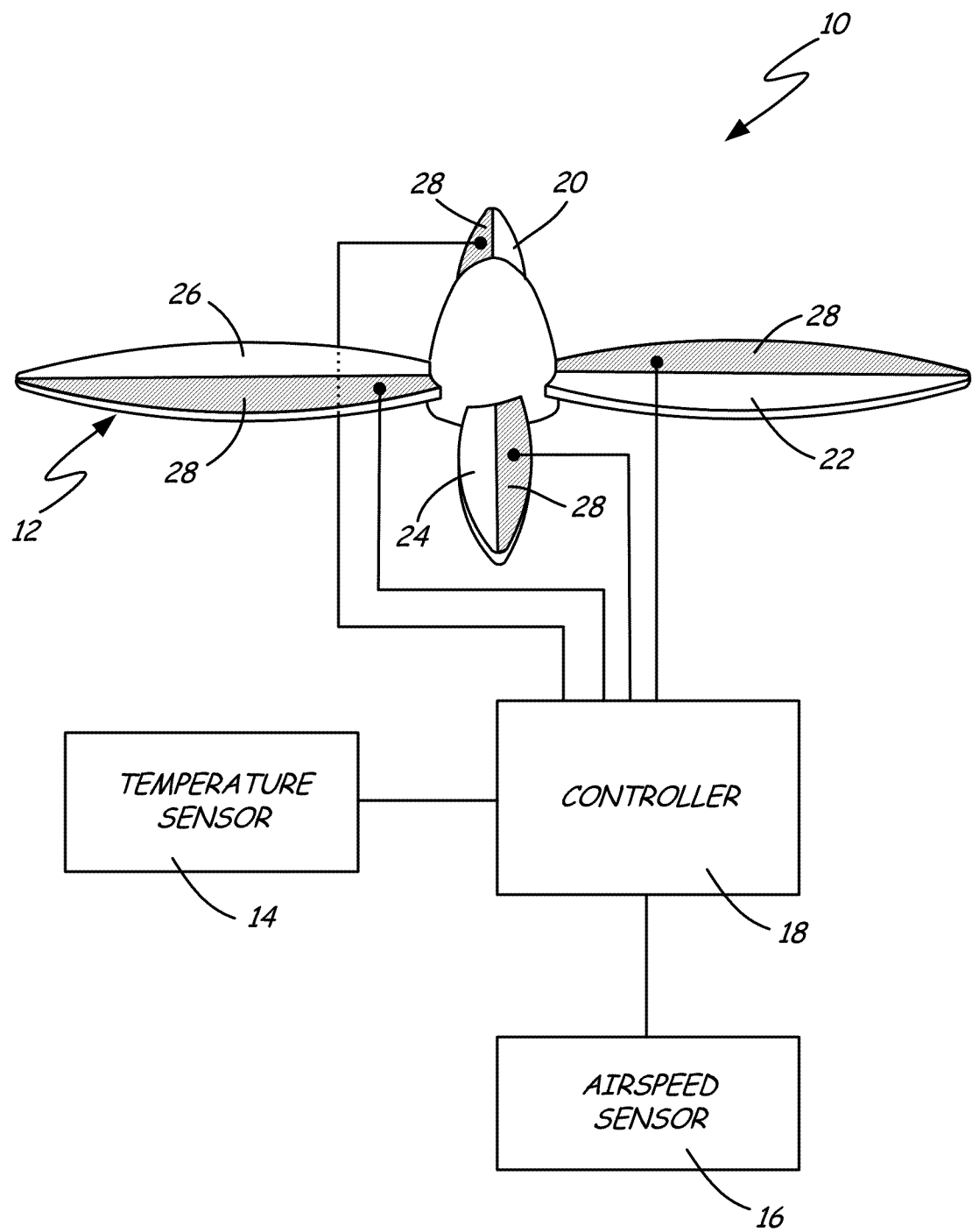
FIG. 1 is a schematic of a propeller deicing system according to the present invention.

FIG. 1 is a schematic of propeller deicing system 10 including propeller 12, temperature sensor 14, airspeed sensor 16, and controller 18. Propeller 12 has four blades 20, 22, 24, 26, but embodiments of the present invention are not limited to any particular number of propeller blades. Each of propeller blades 20-26 includes one heater element 28. Heater elements 28 are supported on blades 20-26 in a conventional manner. Blades 20-26 include two sets of two opposing blades 20, 24 and 22, 26. In some embodiments of the present invention, heaters 28 associated with each set of two or more opposing blades (20, 24 or 22, 26) may be controlled simultaneously to prevent imbalanced conditions where ice accretes on one blade that is opposite from another blade.

Controller 18 receives temperature and airspeed readings from temperature sensor 14 and airspeed sensor 16, and controls the operation of blade heaters 28 as function of the temperature and airspeed inputs. Controller 18 is electrically connected to temperature sensor 14 and airspeed sensor 16 to receive ambient temperature information and aircraft airspeed information respectively. Temperature sensor 14 may be any conventional sensor capable of detecting ambient air temperature. Temperature sensor 14 may be connected to the aircraft on which propeller 12 is mounted at any convenient location to measure the necessary ambient temperature information. Temperature sensor 14 may be, for example, a standard platinum sense resistor. Alternatively, temperature sensor 14 may be a non-linear thermistor or a silicon resistor. However, in general, any temperature sensor appropriate for the intended application may be selected. As with temperature sensor 14, airspeed sensor 16 may be any sensor capable of detecting the airspeed of the aircraft to which propeller 12 is connected. The system may include additional sensors to detect quantities such as aircraft altitude and propeller rpm in order to further specify the flight condition.

Figure 2:
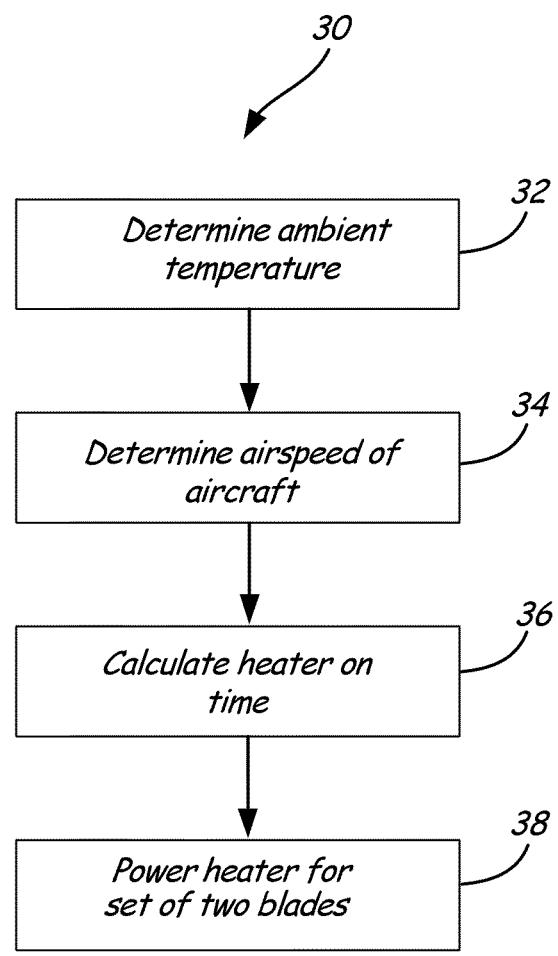
FIG. 2 is a flow chart illustrating a method of deicing propeller blades on an aircraft according to the present invention.

FIG. 2 is a flow chart of method 30 of deicing propeller blades on an aircraft, which initially involves determining an ambient temperature (step 32) and airspeed of the aircraft (step 34). The ambient temperature and aircraft airspeed may be determined, as described above, using conventional temperature and speed sensors appropriately mounted on the aircraft for taking measurements.

In addition to determining an ambient temperature (step 32) and airspeed of the aircraft (step 34), method 30 also includes calculating heater on and off times as a function of the ambient temperature and the airspeed (step 36). The heater timing cycle for deicing systems according to the present invention, generally speaking, includes a heater on time and a heater off time the sum of which defines one complete cycle. For balance reasons, propeller blades are typically deiced as opposing sets of blades (i.e. two sets of two blades on a four blade propeller, three sets of two blades or two sets of three blades on a six blade propeller, four sets of two blades or two sets of four blades on an eight blade propeller, etc.). These sets of blades are heated in sequence to keep overall power usage at an acceptable level. In one embodiment of the present invention, an eight blade propeller has four opposing sets of two blades. Each of the four sets of two blades is heated in sequence. In this embodiment, because there are four sets of heaters and only one set can be powered at a time, the heater off time must be at least three times the heater on time. This means that the maximum duty cycle is one in four. Assuming that this maximum duty cycle is optimum, this relationship between the on and off time, and the fact that the desired peak surface temperature is near 32° Fahrenheit, can be used to define optimum timing cycles.

Figure 3:
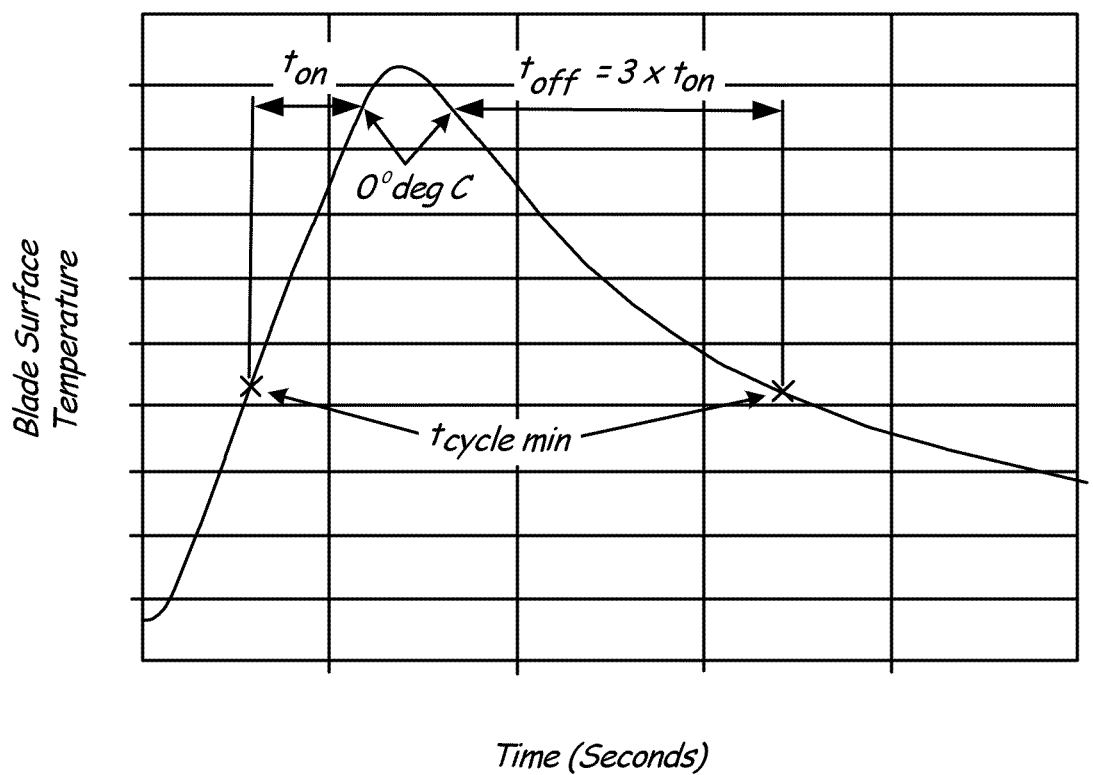
FIG. 3 is an illustrative graph of blade surface temperature as a function of time for an embodiment of the method of FIG. 2.

A schedule of optimum heater on and off times may be developed by calculating optimum heater cycle times at an array of ambient temperature and airspeed. This may include calculating a plurality of blade surface temperatures over a period of time with the heater on at a first time and the heater off when the surface temperature of the blade reaches approximately 32° Fahrenheit (0° Celsius), and determining the optimum heater on time from the calculated blade surface temperatures. The analysis can be performed for as many ambient temperature/velocity (and optionally rpm/ altitude) combinations deemed necessary. For a given ambient temperature and airspeed, conventional heat transfer analysis may be used to calculate the time required to heat the surface of a propeller blade to 32° Fahrenheit (0° Celsius). The analysis may then be repeated to simulate turning the heater off shortly after the blade surface reaches 32° Fahrenheit (0° Celsius) to provide curves of the blade surface temperature as a function of time with a peak temperature near 32° Fahrenheit (0° Celsius). FIG. 3 is an example graph of blade surface temperature as a function of time with the heater on at a first time and the heater off when the surface temperature of the blade reaches approximately 32° Fahrenheit (0° Celsius). The overshoot in temperature above 32° Fahrenheit (0° Celsius) is due in part to the fact that the resolution of the calculations in time in this example do not allow for the application of heat to stop at exactly 32° Fahrenheit (0° Celsius).

The relationship between blade surface temperature and time for a given heater cycle, as illustrated in FIG. 3, can then be used to determine the heater on time by calculating a minimum heating cycle blade surface temperature from which the blade will heat to approximately 32° Fahrenheit (0° Celsius) in an optimum heater on time and to which the blade will cool from approximately 32° Fahrenheit (0° Celsius) in an optimum heater off time that is equal to the optimum heater on time multiplied by the number of sets of blades in the plurality of blades minus one.

For example, the curve of FIG. 3 can be used to determine the one in four timing cycle for which the heater will cycle with a peak temperature of 32° Fahrenheit (0° Celsius). This is done by determining the minimum heating cycle temperature for which the time it takes the blade surface to heat up to 32° Fahrenheit (0° Celsius) is one third of the time it takes to cool down from 32° Fahrenheit (0° Celsius) to the same minimum heating cycle temperature. For the example shown in FIG. 3, the minimum cycle temperature is $T_{cycle\ min}$ and the heater on time is $t_{on}$, which is one third of the heater off time $t_{off}$.

Determining the optimum heater on time, and therefore the corresponding heater off time, from blade surface temperatures can be more easily visualized by dividing the curve from FIG. 3 into heater on time and heater off time pieces. The heater on time portion can be plotted as minimum heating cycle temperature vs. the heater on time by reversing the time scale with zero time at the point where the temperature reaches 32° Fahrenheit (0° Celsius). The heater off time portion can be plotted on the same scale by shifting the 32° Fahrenheit (0° Celsius) point to zero time and dividing the original time scale by the number of sets of blades in the plurality of blades minus one. The result for the example in FIG. 3 is illustrated in the curves plotted in FIG. 4. Curve A represents the heater on time and curve B represents the heater off time. The two curves A, B cross at the optimum heater on time.

Figure 4:
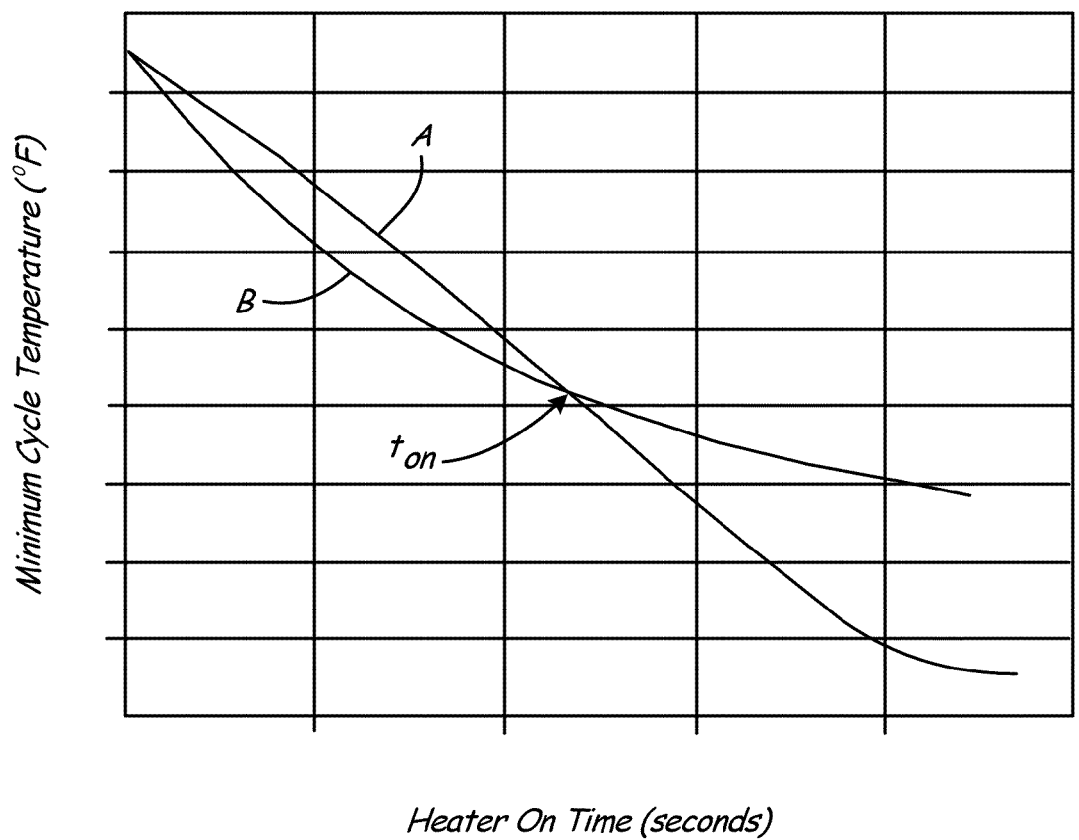
FIG. 4 is an illustrative graph of minimum heating cycle temperature as a function of heater on time for an embodiment of the method of FIG. 2.

The analysis set out with reference to FIGS. 3 and 4 may be performed at a range of ambient temperature and aircraft airspeed combinations that cover the operating range of the aircraft. The resulting heater timing cycles at various combinations of ambient temperature and aircraft airspeed will have a peak blade surface temperature near 32° Fahrenheit (0° Celsius).

In some cases this analysis may result in undesirably long heater cycle times. To avoid a situation where ice does not shed on the first cycle and a large amount of ice accretes during the long heater off time, the maximum timing cycle may need to be limited.

At warmer temperatures, the two curves in the minimum temperature versus heater on time plot shown in FIG. 4 may not cross. This indicates that there is no heater on time for which a duty cycle of one in the number of sets of blades will maintain a peak temperature of 32° Fahrenheit (0° Celsius). To account for these operating conditions, a minimum heater on time, $t_{min\ on}$, can be chosen. For heater on times less than $t_{min\ on}$ or when no heater on time can be defined, a delay time can be added to the heater off time (shifting the heater off time curve in FIG. 4 to the left) such that $t_{min\ on}$ results in a peak temperature of 32° Fahrenheit (0° Celsius). In some cases this will result in long heater off times. Therefore, similar to the limitation which may need to be applied on the minimum heater on time, the heater off time calculated in this situation may also need to be limited by, for example, setting a maximum heater off time, $t_{max\ off}$.

Figure 5:
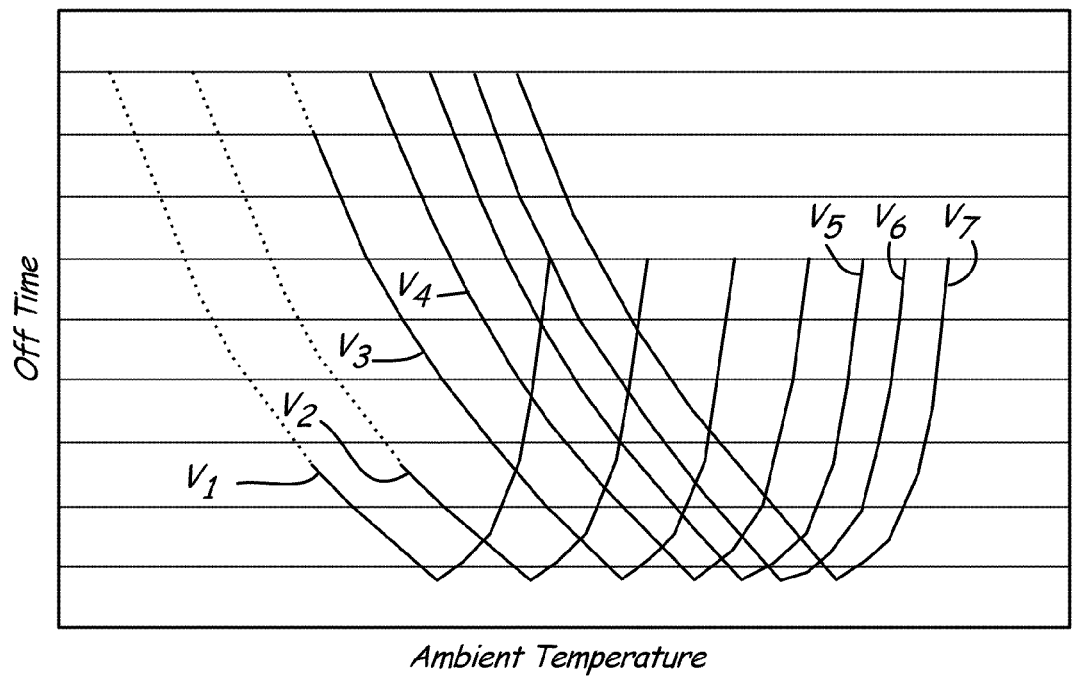
FIG. 5 is an illustrative graph of heater on and off times as a function of aircraft airspeed and ambient temperature for an embodiment of the method of FIG. 2.

An example of the resulting heater on and off times is plotted as a function of aircraft airspeed and ambient temperature in FIG. 5. Each of the curves $v_1$-$v_7$ shown in FIG. 5 represents a heater timing cycle, i.e. heater on and off times, as a function of ambient temperature at one of seven different aircraft airspeeds. FIG. 5 is meant to be illustrative only and it will be understood that the heater timing cycle curves may be calculated for any aircraft airspeed.

In addition to calculating a heater on time as a function of the ambient temperature and aircraft airspeed (step 36), method 30 also includes powering a heater for a set of opposing blades in the plurality of blades for the heater on time (step 38). The heater for the remaining sets of opposing blades may then be powered in sequence to complete one heating cycle. After completing one heating cycle, deicing systems according to the present invention may repeat another heating cycle with the same heater on and off times, or may take new ambient temperature and aircraft airspeed measurements and then repeat another heating cycle with heater on and off times calculated based on the new temperature and speed conditions.

As a further enhancement to methods and systems according to the present invention, the maximum ambient temperature where the heaters will be turned on, $T_{max\ on}$, can be defined as a function of the aircraft airspeed. The temperature limit corresponding to $T_{max\ on}$ can be defined by determining the temperature above which the blade surface temperature is near the freezing point due to dynamic heating alone with no additional heat from the deicing system. This may mean that for certain conditions, the propeller deicing system will be activated but the blade heaters will not be turned on.

Figure 6:
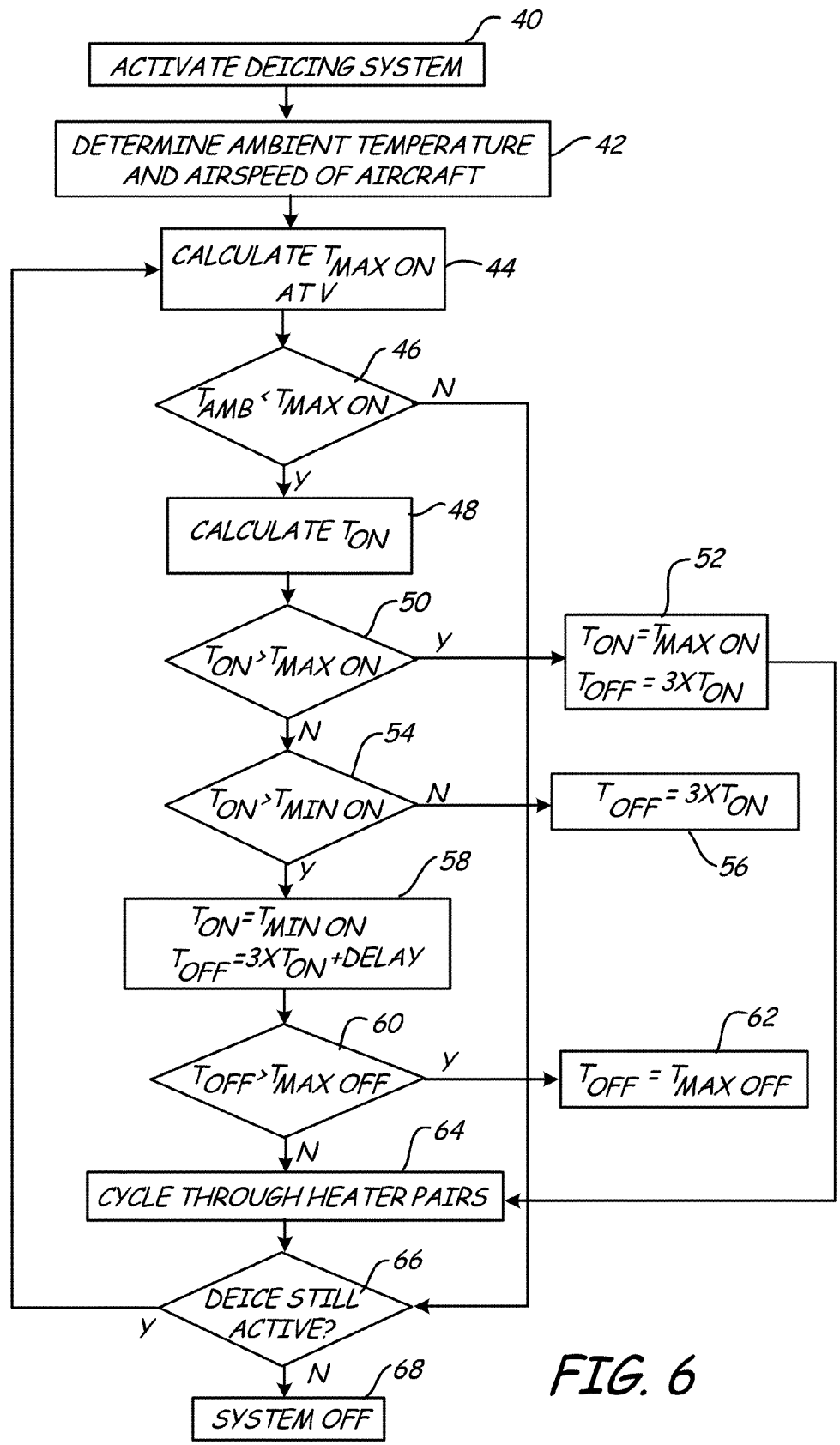
FIG. 6 is a flow chart illustrating a process of operating deicing heaters with timing cycles defined by the method of FIG. 2.

FIG. 6 is a flow chart which outlines a process of operating the deicing heaters with timing cycles defined as outlined above for the example with four sets of heaters. In the embodiment shown in FIG. 6, either the pilot or the aircraft ice detection system signals the propeller deicing system that ice accretion is occurring (step 40) and an ambient temperature, $T_{amb}$, and airspeed of the aircraft, v, are determined (step 42). The ambient temperature and aircraft airspeed may be determined, as described above, using conventional temperature and speed sensors appropriately mounted on the aircraft for taking measurements.

The ambient temperature and aircraft airspeed are transmitted to the deicing system. The propeller deicing system may then determine in a conventional manner, based on airspeed and ambient temperature, whether or not to activate the blade heaters by determining whether or not the $T_{amb}$ is less than $T_{max\ on}$ by first calculating $T_{max\ on}$ (step 44) and then comparing $T_{amb}$ to $T_{max\ on}$ (step 46). If the ambient temperature ($T_{amb}$) is greater than $T_{max\ on}$ the blade heaters are not powered. However, the propeller deicing system continues to monitor ambient temperature and airspeed, calculate $T_{max\ on}$, and compare to $T_{amb}$ for as long as the aircraft or pilot is signaling that accretion is occurring.

When $T_{amb}$ is less than $T_{max\ on}$ the heater on time ($t_{on}$) is calculated (step 48) based on the results of the analysis outlined above. If the calculated heater on time is greater than a defined maximum on time (step 50), $t_{on}$ is set to the maximum on time, $t_{max\ on}$, and the heater off time ($t_{off}$) is set to (in the example that includes eight propeller blades set out above) 3 times the maximum heater on time (step 52). If the calculated heater on time is greater than or equal to a defined minimum on time (step 54) and less than or equal to the maximum on time, $t_{on}$ is not changed, and $t_{off}$ is set to 3 times $t_{on}$ (step 56). If the calculated heater on time is less than the minimum on time (step 54), $t_{on}$ is set to the minimum on time, $t_{min\ on}$, and the appropriate $t_{off}$ including a delay time may be calculated (step 58). If the resulting calculated heater off time is greater than a maximum heater off time (step 60), $t_{off}$ is set to the maximum off time, $t_{max\ off}$ (step 62). The heater off time, $t_{off}$, can be greater than $t_{max\ off}$ when the original $t_{on}$ is not less than $t_{min\ on}$.

In the embodiment illustrated in FIG. 6, with the heater on and off times defined, each of the heater sets associated with each of the sets of opposing propeller blades is turned on in sequence (step 64). When the deicing cycle is complete for all heater sets, the propeller system will check to see that the aircraft system or pilot is still requesting propeller deicing (step 66). If so, the calculation of the appropriate timing cycle and operation of heaters is repeated. If not, the deicing system is turned off (step 68).

Embodiments of the present invention improve on prior propeller deicing systems and methods by increasing the effectiveness of ice removal by dynamically adjusting the heating timing cycle for a variety of flight conditions. Methods and systems according to the present invention calculate deicing heater timing cycles, i.e. heater on/heater off schedules, as a function of both ambient temperature and the airspeed of the aircraft. Including the aircraft airspeed better optimizes the heater timing cycles for particular flight conditions and thereby accounts for factors like dynamic heating at higher airspeeds that replace or augment the need to power deicing system. The present invention may be expanded to include the influence of other flight condition variables such as altitude and propeller rpm. Increasing the effectiveness of the deicing system generally reduces the amount of ice accreted on the propeller blades between ice shedding, resulting in improved aircraft performance in icing conditions and decreased energy of shed ice impacts on the aircraft structure.

Although the present invention has been described with reference to particular embodiments, workers skilled in the art will recognize that changes may be made in form and detail without departing from the scope of the invention as defined by the claims that follow.

The invention claimed is:

1. A method of deicing a plurality of propeller blades on an aircraft, the method comprising:
   determining an ambient temperature;
   determining an airspeed of the aircraft;
   calculating a heater on time as a function of the ambient temperature and the airspeed; and
   powering a heater for one or more blades in the plurality of blades for the heater on time.

2. The method of claim 1, wherein powering a heater comprises powering the heater for a set of two or more opposing blades in the plurality of blades for the heater on time.

3. The method of claim 1 further comprising setting a minimum heater on time and a maximum heater on time.

4. The method of claim 1, wherein calculating a heater on time is as a function of the ambient temperature, the airspeed, and propeller rpm.

5. The method of claim 1, wherein calculating a heater on time is a function of the ambient temperature, the airspeed, and aircraft altitude.

6. The method of claim 1, wherein calculating a heater on time is a function of the ambient temperature, the airspeed, the aircraft altitude, and propeller rpm.

7. The method of claim 2, wherein calculating the heater on time comprises:
   calculating, for the ambient temperature and the airspeed determined, a plurality of blade surface temperatures over a period of time with the heater on at a first time and the heater off when the surface temperature of the blade reaches approximately 32° Fahrenheit (0° Celsius); and
   determining the heater on time from the calculated blade surface temperatures.

8. The method of claim 3, and further comprising:
   comparing a calculated heater on time to the minimum heater on time and the maximum heater on time; and
   setting the heater on time to one of the calculated heater on time, the minimum heater on time, and the maximum heater on time.

9. The method of claim 2 further comprising calculating a maximum ambient temperature above which the heater does not need to be powered due to dynamic heating of the blades independent of the heater.

10. The method of claim 7, wherein a heater off time is equal to the heater on time multiplied by a number of sets of blades in the plurality of blades minus one.

11. The method of claim 10, wherein determining the heater on time comprises calculating, for the calculated blade surface temperatures, a minimum heating cycle blade surface temperature from which the blade will heat to approximately 32° Fahrenheit (0° Celsius) in an optimum heater on time and to which the blade will cool from approximately 32° Fahrenheit (0° Celsius) in an optimum heater off time that is equal to the optimum heater on time multiplied by the number of sets of blades in the plurality of blades minus one.

12. The method of claim 8, wherein the heater on time is set to the calculated heater on time if the calculated heater on time is greater than or equal to the minimum heater on time and less than or equal to the maximum heater on time.

13. The method of claim 8, wherein the heater on time is set to the maximum heater on time if the calculated heater on time is greater than the maximum heater on time.

14. The method of claim 8, wherein the heater on time is set to the minimum heater on time if the calculated heater on time is less than the minimum heater on time.

15. The method of claim 14, wherein a heater off time is equal to the heater on time multiplied by the number of sets of blades in the plurality of blades minus one, plus a time delay if the heater on time is set to the minimum heater on time.

16. The method of claim 9 further comprising:
   comparing the ambient temperature to the maximum ambient temperature; and powering the heater for the set of blades for the heater on time only if the ambient temperature is less than or equal to the maximum ambient temperature.

17. A deicing system for a plurality of propeller blades on an aircraft, the system comprising:
 a first sensor connected to the aircraft and configured to determine an ambient temperature;
 a second sensor connected to the aircraft and configured to determine an airspeed of the aircraft;
 a plurality of heaters each of which is connected to one of the propeller blades; and
 a controller configured to calculate a heater on time as a function of the ambient temperature and the airspeed determined by the first and the second sensor, and power the heaters associated with a set of opposing blades in the plurality of blades for the heater on time.

18. The system of claim 17, wherein the controller calculates the heater on time based upon, the ambient temperature and the airspeed determined, a plurality of blade surface temperatures over a period of time with the heater on at a first time and the heater off when the surface temperature of the blade reaches approximately 32° Fahrenheit (0° Celsius).

19. The system of claim 17, wherein the controller:
 calculates a maximum ambient temperature above which the heater does not need to be powered due to dynamic heating of the blades independent of the heater;
 compares the ambient temperature to the maximum ambient temperature; and
 powers the heater for the set of blades for the heater on time only if the ambient temperature is less than or equal to the maximum ambient temperature.

20. The system of claim 18, wherein the controller determines a heater off time that is equal to the heater on time multiplied by a number of sets of blades in the plurality of blades minus one.

21. The system of claim 20, wherein the controller calculates, for the calculated blade surface temperatures, a minimum heating cycle blade surface temperature from which the blade will heat to approximately 32° Fahrenheit (0° Celsius) in an optimum heater on time and to which the blade will cool from approximately 32° Fahrenheit (0° Celsius) in an optimum heater off time that is equal to the optimum heater on time multiplied by the number of sets of blades in the plurality of blades minus one.

22. The system of claim 21, wherein the controller sets a minimum heater on time and a maximum heater on time.

23. The system of claim 22, wherein determining the heater on time further comprises:
 compares the optimum heater on time to the minimum heater on time and the maximum heater on time; and
 sets the heater on time to one of the optimum heater on time, the minimum heater on time, and the maximum heater on time.

24. The system of claim 23, wherein the controller:
 sets the heater on time to the optimum heater on time if the optimum heater on time is greater than or equal to the minimum heater on time and less than or equal to the maximum heater on time;
 sets the heater on time to the maximum heater on time if the optimum heater on time is greater than the maximum heater on time; and
 sets the heater on time is set to the minimum heater on time if the optimum heater on time is less than the minimum heater on time.

25. The system of claim 24, wherein the controller sets the heater off time equal to the heater on time multiplied by the number of sets of blades in the plurality of blades minus one, plus a time delay if the heater on time is set to the minimum heater on time.

* * * * *